United States Patent
Tsuruoka et al.

(10) Patent No.: US 10,220,640 B2
(45) Date of Patent: Mar. 5, 2019

(54) TABLET PRINTING APPARATUS

(71) Applicant: SHIBAURA MECHATRONICS CORPORATION, Yokohama-shi (JP)

(72) Inventors: Yasutsugu Tsuruoka, Yokohama (JP); Hironori Haijima, Yokohama (JP); Toru Kuribayashi, Yokohama (JP); Yuki Umemura, Yokohama (JP)

(73) Assignee: SHIBAURA MECHATRONICS CORPORATION, Yokohama-shi (JP)

( * ) Notice: Subject to any disclaimer, the term of this patent is extended or adjusted under 35 U.S.C. 154(b) by 0 days.

(21) Appl. No.: 15/963,549

(22) Filed: Apr. 26, 2018

(65) Prior Publication Data

US 2018/0311974 A1    Nov. 1, 2018

(30) Foreign Application Priority Data

Apr. 27, 2017  (JP) .................................. 2017-088844
Mar. 29, 2018  (JP) .................................. 2018-063513

(51) Int. Cl.
   *B41J 11/00*  (2006.01)
   *B65G 15/58*  (2006.01)
   *B41J 3/407*  (2006.01)

(52) U.S. Cl.
   CPC ............. *B41J 11/007* (2013.01); *B41J 3/407* (2013.01); *B41J 11/0085* (2013.01); *B65G 15/58* (2013.01)

(58) Field of Classification Search
   CPC ...... B41J 11/007; B41J 3/407; B41J 11/0085; B65G 15/58
   See application file for complete search history.

(56) References Cited

U.S. PATENT DOCUMENTS 7,102,741 B2 *  9/2006  Ackley, Jr. ......... B23K 26/0838
                                               356/237.1
7,114,445 B2 * 10/2006  Ackley, Jr. ............... A23G 3/28
                                                 101/485

FOREIGN PATENT DOCUMENTS

JP          7-81050         3/1995
JP         2017-6457        1/2017
JP       2017-006457 A  *  1/2017  ................ A61J 3/06

* cited by examiner

*Primary Examiner* — Yaovi M Ameh
(74) *Attorney, Agent, or Firm* — Oblon, McClelland, Maier & Neustadt, L.L.P.

(57) ABSTRACT

According to one embodiment, a tablet printing apparatus includes: a conveyor belt including a suction hole to suck a tablet; and an ink jet print head configured to perform printing on the tablet; wherein the conveyor belt further includes a plurality of protrusions formed around the suction hole and configured to support the tablet in contact with the tablet, and a recess formed between the protrusions and communicated with the suction hole, each of the protrusions has a bottom surface, an upper surface, area of which is smaller than that of the bottom surface, and a side surface having an inclined surface, the protrusions support the tablet such that a gap is formed between a surface of the tablet on conveyor belt side and the suction hole, and a suction force is applied to the gap and space of the recess through the suction hole to suck the tablet.

12 Claims, 10 Drawing Sheets

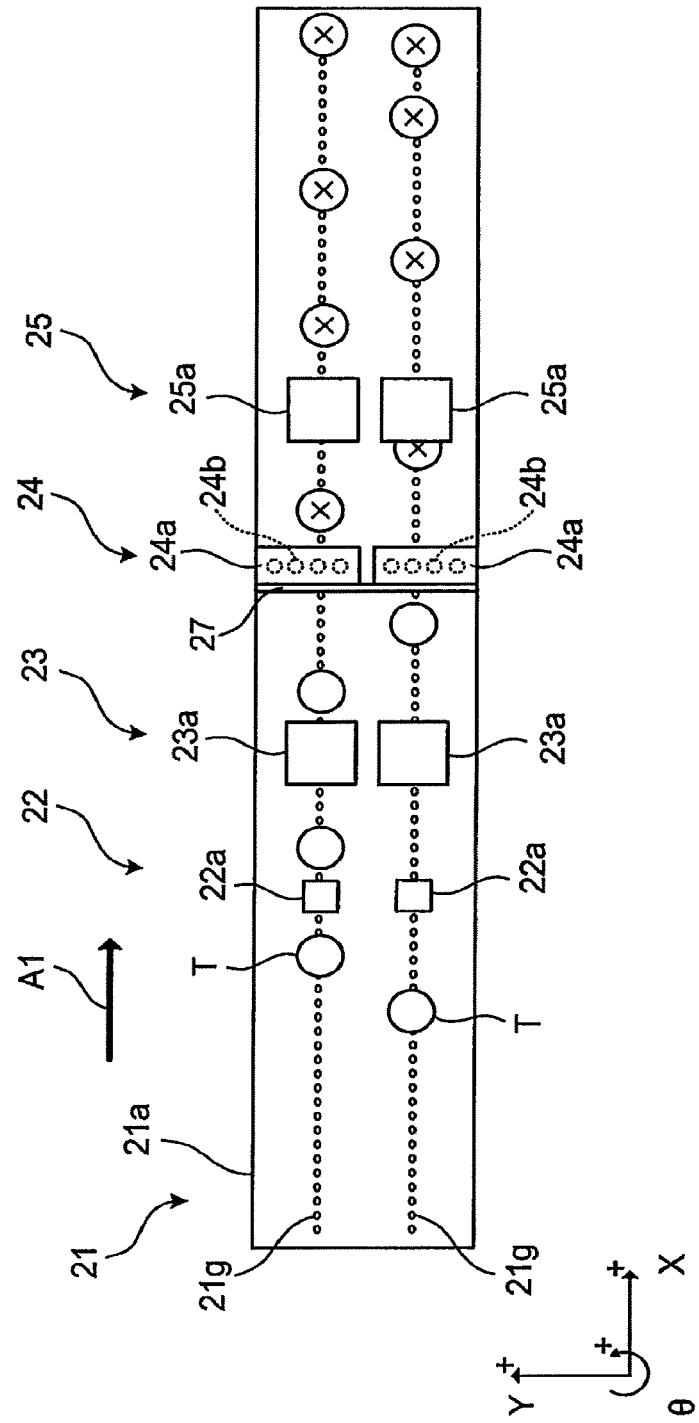

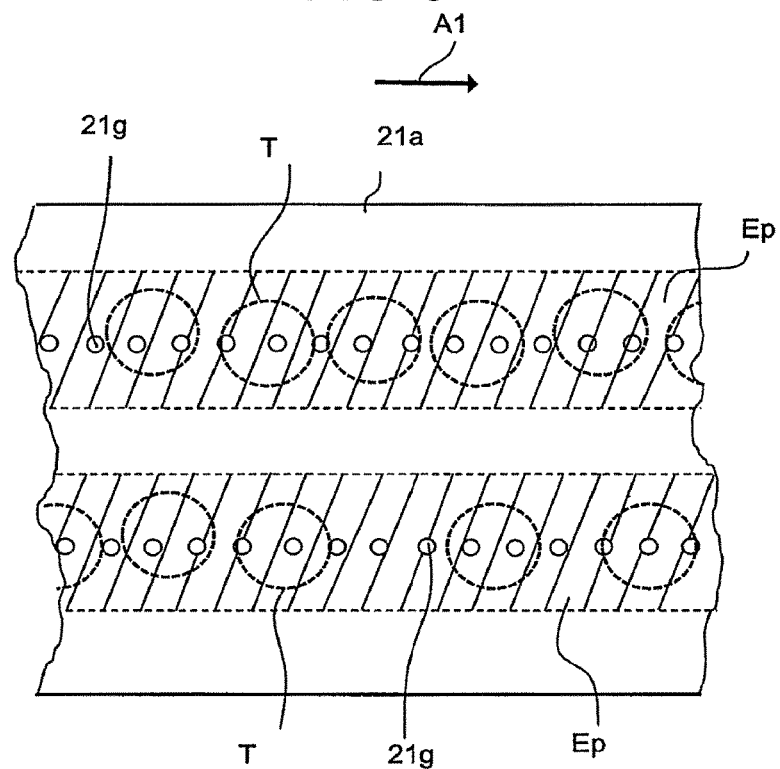
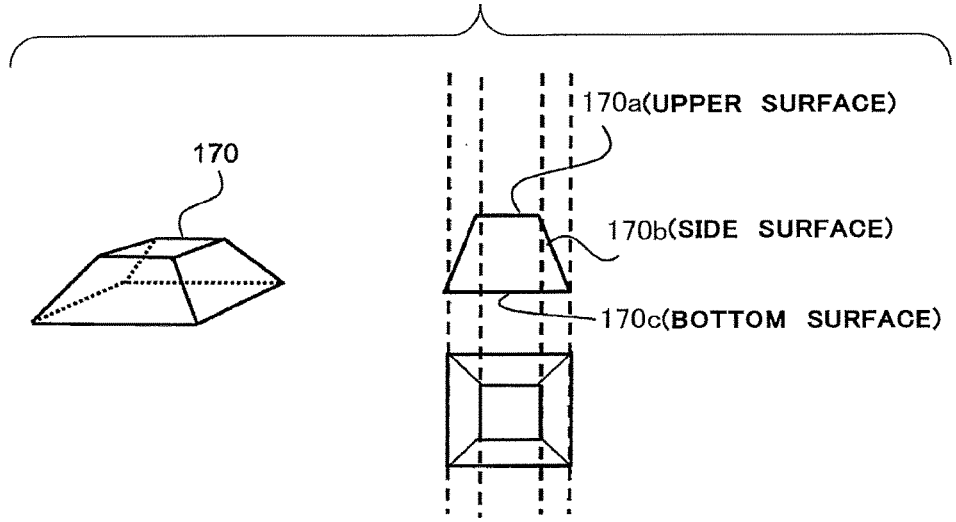

TABLET PRINTING APPARATUS

CROSS-REFERENCE TO THE RELATED APPLICATION

This application is based upon and claims the benefit of priority from Japanese Patent Applications No. 2017-088844, filed on Apr. 27, 2017 and No. 2018-063513, filed on Mar. 29, 2018; the entire contents of all of which are incorporated herein by reference.

FIELD

Embodiments described herein relate generally to a tablet printing apparatus.

BACKGROUND

There has been known a tablet printing apparatus that uses an inkjet print head to print a character, a letter, a mark, or the like on a tablet. In the tablet printing apparatus, tablets are conveyed by a conveyor belt, and ink is ejected from the ejection port of the inkjet print head (nozzle opening) located above the conveyor belt toward each tablet passing under the print head to perform printing on the tablet.

Meanwhile, the tablets sucked and conveyed by the conveyor belt may sometimes shake on the conveyor belt. This is due to continuous vibration caused by the supply of the tablets dropped from above the conveyor belt or is due to a slight swing of the moving conveyor belt, or the like. If the tablet continues to shake until it passes under the print head, normal printing cannot be performed. Therefore, it is necessary to suppress the shaking motion of the tablet on the conveyor belt as much as possible.

BRIEF DESCRIPTION OF THE DRAWINGS

FIG. 2 is a plan view illustrating a part of a first printing device of the embodiment;

FIG. 3 is a plan view illustrating a shake prevention region of a conveyor belt of the embodiment;

FIG. 4 is a diagram illustrating a protrusion provided to the conveyor belt;

DETAILED DESCRIPTION

According to one embodiment, a tablet printing apparatus includes: a conveyor belt including a suction hole to suck a tablet; and an ink jet print head configured to perform printing on the tablet conveyed by the conveyor belt. The conveyor belt further includes a plurality of protrusions formed around the suction hole and configured to support the tablet in contact with the tablet, and a recess formed between the protrusions and communicated with the suction hole. Each of the protrusions has a bottom surface, an upper surface, area of which is smaller than that of the bottom surface, and a side surface having an inclined surface. The protrusions are configured to support the tablet such that a gap is formed between a surface of the tablet on conveyor belt side and the suction hole, and a suction force is applied to the gap and space of the recess through the suction hole to suck the tablet.

Embodiment

An embodiment will be described with reference to the drawings.

(Basic Configuration)

Figure 1:
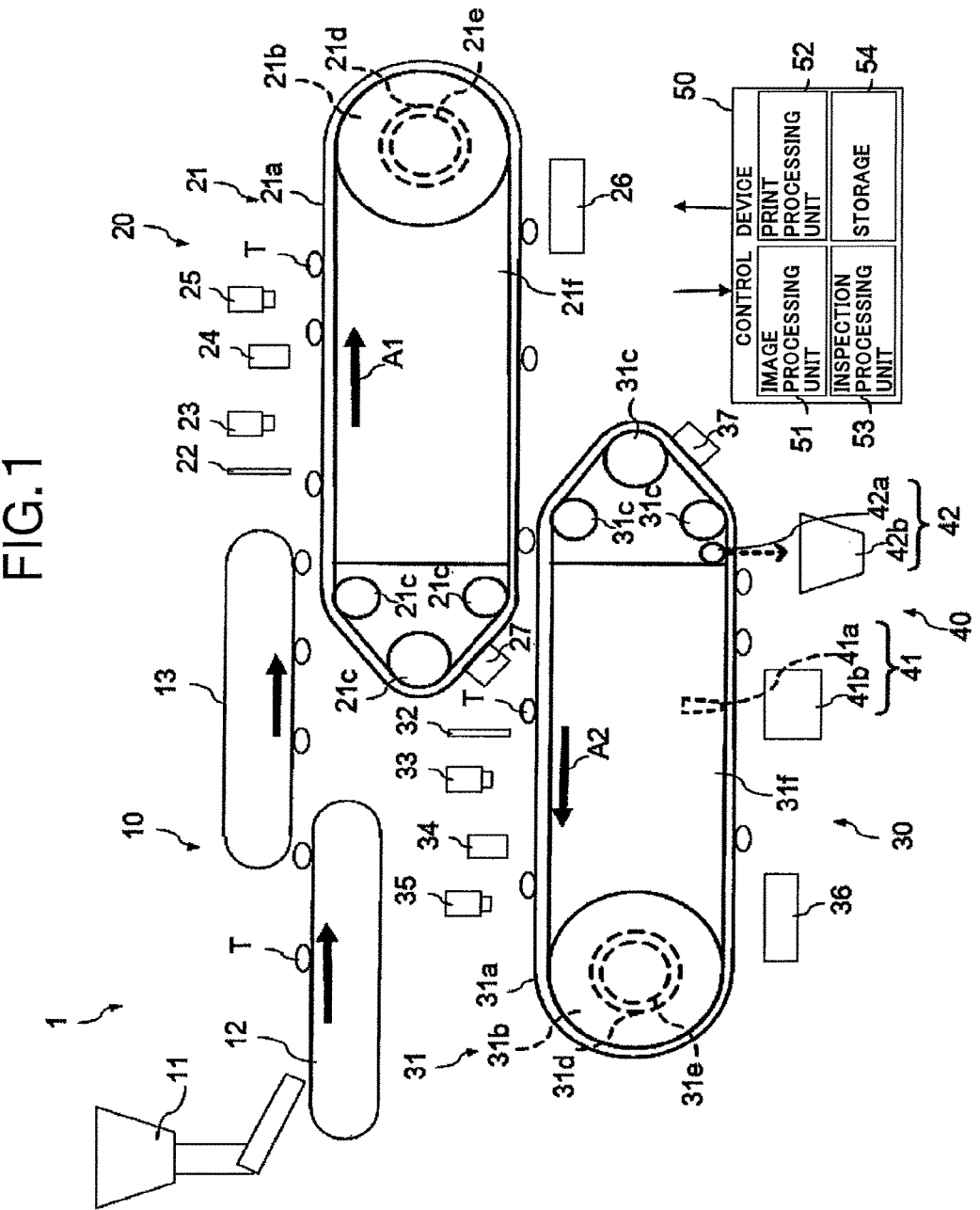
FIG. 1 is a diagram illustrating the schematic configuration of a tablet printing apparatus according to an embodiment.

As illustrated in FIG. 1, a tablet printing apparatus 1 of the embodiment includes a supply device 10, a first printing device 20, a second printing device 30, a collecting device 40, and a control device 50. The first printing device 20 and the second printing device 30 basically have the same structure.

The supply device 10 includes a hopper 11, an alignment feeder 12, and a transfer feeder 13. The supply device 10 is configured to be capable of supplying tablets T to be printed to the first printing device 20, and is located on one end side of the first printing device 20. The hopper 11 stores a number of tablets T and sequentially supplies the tablets T to the alignment feeder 12. The alignment feeder 12 aligns the tablets T in two rows and conveys them to the transfer feeder 13. The transfer feeder 13 sequentially sucks the tablets T on the alignment feeder 12 and conveys them in two rows to the first printing device 20. The transfer feeder 13 supplies the first printing device 20 with the tablets T in two rows. The supply device 10 is electrically connected to the control device 50, and is driven under the control of the control device 50. As the alignment feeder 12 and the transfer feeder 13, for example, a belt conveying mechanism can be used.

The first printing device 20 includes a conveying device (tablet conveying device) 21, a detecting device 22, a first imaging device (imaging device for printing) 23, a print head device 24, a second imaging device (imaging device for inspection) 25, a drying device 26, and a cleaning device 27.

The conveying device 21 includes a conveyor belt 21a, a pulley body 21b as a driving pulley, a plurality of driven pulleys 21c (three in the example of FIG. 1), a motor (driving unit) 21d, a position detector 21e, and a suction chamber 21f. The conveyor belt 21a is formed to be endless and wrapped around the pulley body 21b and each of the driven pulleys 21c. The pulley body 21b and the driven pulleys 21c are rotatably provided to the apparatus main body, and the pulley body 21b is connected to the motor 21d. The motor 21d is electrically connected to the control device 50, and is driven under the control of the control device 50. The position detector 21e is a device such as an encoder and is attached to the motor 21d. The position detector 21e is electrically connected to the control device 50, and sends a detection signal to the control device 50. The control device 50 can obtain information such as the position, speed, and movement amount of the conveyor belt 21a based on the detection signal. In the conveying device 21, the conveyor belt 21a is rotated together with the driven pulleys 21c due to the rotation of the pulley body 21b caused by the motor 21d, and the tablets T on the conveyor belt 21a are conveyed in the direction of arrow A1 in FIGS. 1 and 2 (conveying direction A1).

As illustrated in FIG. 2, a plurality of circular suction holes 21g are formed on the surface of the conveyor belt 21a. The suction holes 21g are through holes for sucking and holding each of the tablets T, and are arranged in two rows in parallel along the conveying direction A1 so as to form two conveying paths. Each of the suction holes 21g is connected to the suction chamber 21f (see FIG. 1) to obtain suction force from the suction chamber 21f. The suction chamber 21f is configured to provide (apply) suction force to the tablets T placed in the suction holes 21g of the conveyor belt 21a. A suction device (not illustrated) such as a pump is connected to the suction chamber 21f via a suction pipe (not illustrated), and the inside of the suction chamber 21f is depressurized by the operation of the suction device. The suction pipe is connected to substantially the center of a side surface (a surface parallel to the conveying direction A1) of the suction chamber 21f. The suction device is electrically connected to the control device 50, and is driven under the control of the control device 50.

The detecting device 22 includes a plurality of detectors 22a (two in the example of FIG. 2). The detectors 22a are located on the downstream side of the position where the tablets T are supplied by the supply device 10 on the conveyor belt 21a in the conveying direction A1. The detectors 22a are arranged in a direction crossing the conveying direction A1 (for example, a direction perpendicular to the conveying direction A1) in a horizontal plane, one for each conveying path of the tablets T, and are located above the conveyor belt 21a. The detectors 22a detect the position (position in the conveying direction A1) of the tablet T on the conveyor belt 21a by projecting and receiving laser beams, and functions as a trigger sensor of each device located on the downstream side. As the detectors 22a, various laser sensors such as reflection laser sensors can be used. Each of the detectors 22a is electrically connected to the control device 50, and sends a detection signal to the control device 50.

The first imaging device 23 includes a plurality of imaging units 23a (two in the example of FIG. 2). The imaging units 23a are located on the downstream side of the position where the detecting device 22 is provided in the conveying direction A1. The imaging units 23a are arranged in a direction crossing the conveying direction A1 (for example, a direction perpendicular to the conveying direction A1) in a horizontal plane, one for each conveying path of the tablets T, and are located above the conveyor belt 21a. Each of the imaging units 23a performs imaging at the time when the tablet T reaches just under the imaging unit 23a based on the position information of the tablet T to capture an image (image for printing) including the upper surface of the tablet T, and sends the image to the control device 50. As the imaging units 23a, various cameras having an imaging device such as a charge-coupled device (CCD) or a complementary metal-oxide semiconductor (CMOS) can be used. Each of the imaging units 23a is electrically connected to the control device 50, and is driven under the control of the control device 50. There may also be provided an illumination for imaging as necessary.

The print head device 24 includes a plurality of ink jet print heads 24a (two in the example of FIG. 2). The print heads 24a are located on the downstream side of the position where the first imaging device 23 is provided in the conveying direction A1. The print heads 24a are arranged in a direction crossing the conveying direction A1 (for example, a direction perpendicular to the conveying direction A1) in a horizontal plane, one for each conveying path of the tablets T, and are located above the conveyor belt 21a. Each of the print heads 24a has a plurality of nozzles 24b (see FIG. 2: only four nozzles are illustrated in the figure), and ejects ink individually from the nozzles 24b. The print heads 24a are arranged so that the alignment direction of the nozzles 24b intersects (for example, perpendicularly to) the conveying direction A1 in a horizontal plane. Each of the print heads 24a performs printing at the time when the tablet T reaches just under the print heads 24a based on the position information of the tablet T. As the print heads 24a, various ink jet print heads having a drive element such as a piezoelectric element, a heating element, a magnetostrictive element or the like can be used. Each of the print heads 24a is electrically connected to the control device 50, and is driven under the control of the control device 50.

The second imaging device 25 includes a plurality of imaging units 25a (two in the example of FIG. 2). The imaging units 25a are located on the downstream side of the position where the print head device 24 is provided in the conveying direction A1. The imaging units 25a are arranged in a direction crossing the conveying direction A1 (for example, a direction perpendicular to the conveying direction A1) in a horizontal plane, one for each conveying path of the tablets T, and are located above the conveyor belt 21a. Each of the imaging units 25a performs imaging at the time when the tablet T reaches just under the imaging unit 25a based on the position information of the tablet T to capture an image (image for inspection) including the upper surface of the tablet T, and sends the image to the control device 50. Similarly to the imaging units 23a, as the imaging units 25a, various cameras having an imaging device such as CCD or CMOS can be used. Each of the imaging units 25a is electrically connected to the control device 50, and is driven under the control of the control device 50. There may also be provided an illumination for imaging as necessary.

Referring back to FIG. 1, the drying device 26 is located on the downstream side of the position where the second imaging device 25 is provided in the conveying direction A1, and is located, for example, below the conveying device 21. The drying device 26 is shared in the two conveying paths, and is configured to dry the ink applied to each tablet T on the conveyor belt 21a. As the drying device 26, various types of dryers such as a heater for drying an object to be dried by radiation heat, a blower for drying an object to be dried with warm air or hot air, and the like can be used. The drying device 26 is electrically connected to the control device 50, and is driven under the control of the control device 50.

The tablet T having passed above the drying device 26 is conveyed along with the movement of the conveyor belt 21a and reaches a position near the end of the conveyor belt 21a on the driven pulley 21c side. At this position, the suction does not work on the tablet T. The tablet T is released from the hold of the conveyor belt 21a, and is transferred from the first printing device 20 to the second printing device 30.

The cleaning device 27 for cleaning the surface of the conveyor belt 21a is provided on the downstream side of the position where the tablets T is transferred from the first printing device 20 to the second printing device 30 in the conveying direction A1. The cleaning device 27 is arranged, for example, near the lower driven pulley 21c. The cleaning device 27 has a rotating brush (not illustrated). The rotating brush is biased by an elastic body such as a spring and rotated while being pressed against the surface of the conveyor belt 21a. The entire rotating brush is covered with a cover, and the inside of the cover is sucked. The cleaning device 27 scrapes off powder or the like generated from the tablets and adhering to the surface of the conveyor belt 21a to remove it. The cleaning device 27 is electrically connected to the control device 50, and is driven under the control of the control device 50.

The second printing device 30 includes a conveying device 31, a detecting device 32, a first imaging device (imaging device for printing) 33, a print head device 34, a second imaging device (imaging device for inspection) 35, a drying device 36, and a cleaning device 37. The conveying device 31 includes a conveyor belt 31a, a pulley body 31b as a driving pulley, a plurality of driven pulleys 31c (three in the example of FIG. 1), a motor (driving unit) 31d, a position detector 31e, and a suction chamber 31f. Each constituent element of the second printing device 30 has basically the same structure as the corresponding constituent element of the first printing device 20 described above, and the same description will not be repeated. Arrow A2 in FIG. 1 indicates the conveying direction of the second printing device 30 (conveying direction A2).

The collecting device 40 includes a defective product collecting device 41 and a non-defective product collecting device 42. The collecting device 40 is located on the downstream side of the position where the drying device 36 of the second printing device 30 is provided in the conveying direction A2. The collecting device 40 collects defective tablets T by the defective product collecting device 41 and collects good tablets T by the non-defective product collecting device 42.

The defective product collecting device 41 includes an ejection nozzle 41a and a container 41b. The ejection nozzle 41a is provided in the suction chamber 31f of the second printing device 30. The ejection nozzle 41a ejects a gas (for example, air) toward the tablet T (defective tablet T) conveyed by the conveyor belt 31a such that the tablet T is dropped from the conveyor belt 31a. At this time, the gas ejected from the ejection nozzle 41a passes through the suction holes (similar to the suction holes 21g illustrated in FIG. 2) of the conveyor belt 31a and hits the tablet T. The ejection nozzle 41a is electrically connected to the control device 50, and is driven under the control of the control device 50. The container 41b receives and stores the tablet T dropped from the conveyor belt 31a.

The non-defective product collecting device 42 includes a gas blower 42a and a container 42b. The non-defective product collecting device 42 is located on the downstream side of the position where the defective product collecting device 41 is provided in the conveying direction A2. The gas blower 42a is provided at the end of the conveying device 31 in the conveying device 31 of the second printing device 30, that is, at the end of the conveyor belt 31a on the driven pulleys 31c side. During the printing process, for example, the gas blower 42a constantly blows a gas (for example, air) toward the conveyor belt 31a to drop the tablet T from the conveyor belt 31a. At this time, the gas blown out from the gas blower 42a passes through the suction holes (similar to the suction holes 21g illustrated in FIG. 2) of the conveyor belt 31a and hits the tablet T. Examples of the gas blower belt 31a include an air blower having a slit-shaped opening extending in a direction crossing the conveying direction A2 (for example, a direction perpendicular to the conveying direction A2) in a horizontal plane. The gas blower 42a is electrically connected to the control device 50, and is driven under the control of the control device 50. The container 42b receives and stores the tablet T dropped from the conveyor belt 31a.

The tablet T having passed through the defective product collecting device 41 is conveyed along with the movement of the conveyor belt 31a, and reaches a position near the end of the conveyor belt 31a on the driven pulleys 31c side. At this position, the suction does not work on the tablet T. However, with the gas blower 42a, the tablet T can be reliably dropped from the conveyor belt 31a and collected in the container 42b.

The control device 50 includes an image processing unit 51, a print processing unit 52, an inspection processing unit 53, and a storage 54. The image processing unit 51 processes an image. The print processing unit 52 performs processing related to printing. The inspection processing unit 53 performs processing related to inspection. The storage 54 stores various information such as processing information and various programs. The control device 50 controls the supply device 10, the first printing device 20, and the second printing device 30. The control device 50 receives position information of the tablets T sent from the detecting devices 22 and 32 of the first printing device 20 and the second printing device 30, images sent from the imaging devices 23, 25, 33 and 35 of the first printing device 20 and the second printing device 30, and the like.

(Conveyor Belt)

As illustrated in FIG. 3, on the conveyor belt 21a, regions of a predetermined width (shaded portion) each including one of two rows of the suction holes 21g at the center is a region Ep where the tablets T can be placed (hereinafter referred to as "shake prevention regions"). Protrusions 170 illustrated in FIG. 4 are formed in each of the shake prevention regions Ep. When the tablets T are transferred from the transfer feeder 13 to the conveyor belt 21a, the tablets T are highly likely to be positioned in the shake prevention regions Ep on the conveyor belt 21a. The shake prevention regions Ep is continuous in the conveying direction A1 and is larger than the size of the tablet T in a direction perpendicular to the conveying direction A1. The tablet T sucked by the transfer feeder 13 is released from the suction and drops onto the conveyor belt 21a. The tablet T dropped is positioned within a certain range on the conveyor belt 21a. More specifically, the range in which the tablet T is positioned on the conveyor belt 21a has a length about 1.5 times the size of the tablet T in a direction perpendicular to the conveying direction A1.

As illustrated in FIG. 4, each of the protrusions 170 has a truncated pyramid shape, i.e., one of frustum shapes. Specifically, the protrusion 170 has a bottom surface 170c, an upper surface 170a, the area of which is smaller than that of the bottom surface 170c, and a side surface 170b, which is a flat inclined surface connecting the bottom surface 170c and the upper surface 170a.

Figure 5:
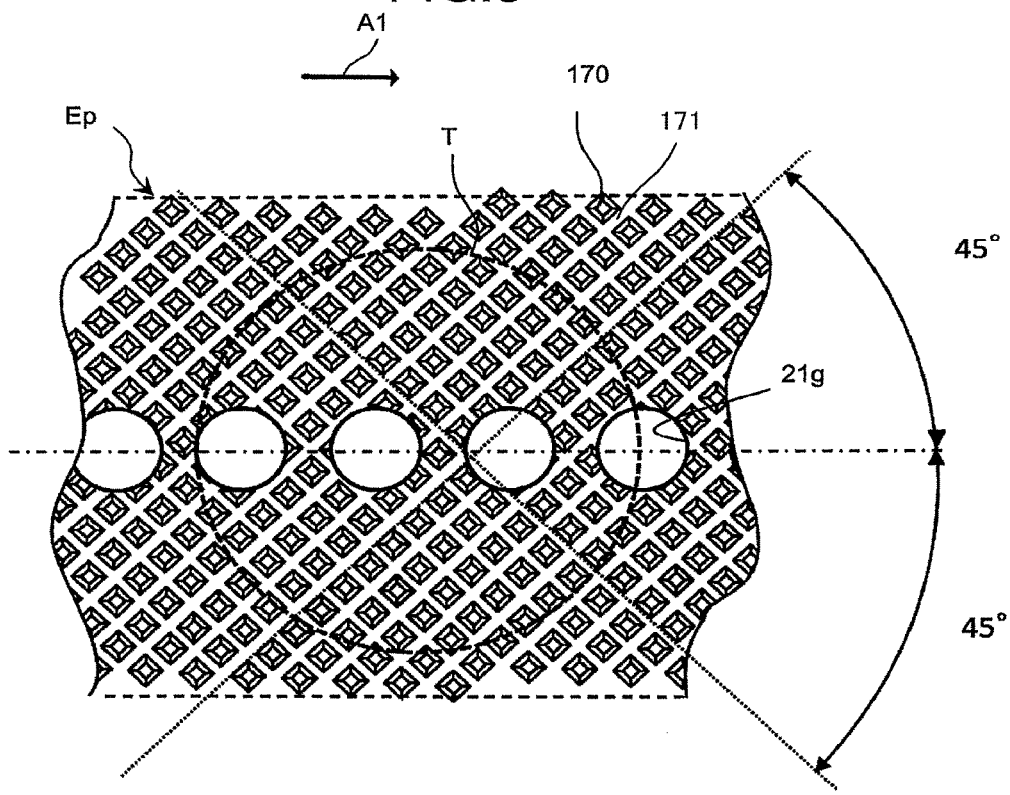
FIG. 5 is a diagram illustrating an arrangement example of protrusions on the conveyor belt.

Further, as illustrated in FIG. 5, the protrusions 170 are arranged in rows. A plurality of rows of the protrusions 170 are arranged in parallel, and are formed along a plane in the shake prevention region Ep on the surface of the conveyor belt 21a. As will be described later with reference to FIG. 8, a plurality of the recesses 171 are formed between the protrusions 170 and aligned in rows between rows of the protrusions 170. The direction of rows of the protrusions 170 is inclined by 45° with respect to the conveying direction A1. That is, the protrusions 170 are arranged along a direction crossing the conveying direction A1 of the tablets T in a horizontal plane. Specifically, the protrusions 170 are formed such that rows of the protrusions 170 inclined by 45° counterclockwise and clockwise with respect to the conveying direction A1 intersect each other. Accordingly, the bottom surface 170c and the upper surface 170a of the protrusion 170 are square in planar view, and the side of the square is inclined by 45° with respect to the conveying direction A1.

As described above, the protrusions 170 are arranged in rows. The pitch between adjacent two rows of the protrusions 170 is set within the range of 1/15 or more and 1/5 or less of the size D of the tablet T, and preferably, it is set to 1/10 of the size D. When the tablet T is circular, the size D of the tablet T is the diameter thereof. When the tablet T is elliptical and has a major axis and a minor axis, the size D of the tablet T is set to the smaller one, i.e., the size of the minor axis.

For example, when the tablet T is circular and its diameter is 7 mm, rows of the protrusions 170 are arranged at a pitch of 0.7 mm. i.e., 1/10 of the diameter.

In this embodiment, the height of each of the protrusions 170 is set within a range of 1/50 or more and 1/2 or less of the thickness (maximum thickness) of the tablet T, and preferably, it is set to 1/10 of the thickness (maximum thickness) of the tablet T. Besides, the height of each of the protrusions 170 is set to at least 100 μm or more. Incidentally, the diameter (maximum diameter) of the tablet T is approximately 5 to 15 mm and the thickness (maximum thickness) is 2 to 8 mm.

As will be described later, the tablet T sometimes has a recessed portion Ta (see FIGS. 10A, 10B and 10C) across the entire surface thereof. When there is such a large recessed portion Ta, the height of each of the protrusions 170 may be set with reference to the height of the recessed portion Ta. That is, the height of the protrusions 170 may be set within a range of 1/50 or more and 1 or less of the height of the recessed portion Ta.

Figure 7:
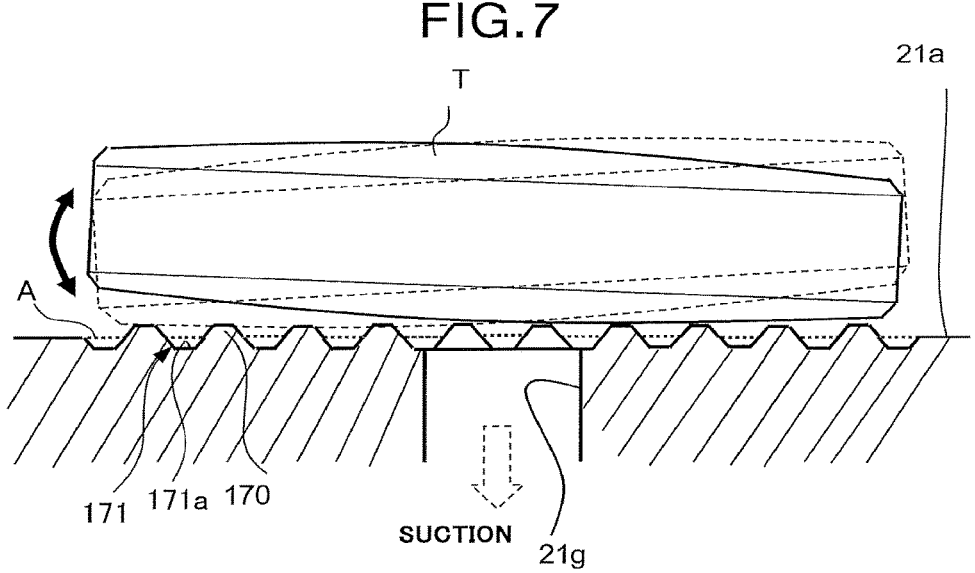
FIG. 7 is a diagram illustrating a tablet that is shaking on the conveyor belt.

The protrusions 170 are formed by pressing a convex-concave mold against the surface of the conveyor belt 21a and simultaneously applying heat. As a result, the protrusions 170 are provided integrally with the conveyor belt 21a. The recess 171 is formed between the protrusions 170. The conveyor belt 21a is made of, for example, urethane resin, and has a hardness of Hs 90. Note that a variety of materials can be used as long as they are flexible and durable, and there is no problem in food hygiene if the tablets T are edible. The hardness of the conveyor belt 21a is preferably selected from a range of Hs 50 to Hs 120. The flexibility can be expressed by, for example, elastic modulus, deformation ratio, and the like. Large flexibility corresponds to low elastic modulus and large deformation ratio. Further, as illustrated in FIG. 7, a bottom surface 171a of the recess 171 is located at a height lower than the height A of the surface of the conveyor belt 21a outside the region where the protrusions 170 are formed.

(Printing Process)

Next, a description will be given of printing process performed by the tablet printing apparatus 1.

First, various information such as print data required for printing is stored in the storage 54 of the control device 50. Then, when a number of tablets T to be printed are put in the hopper 11 of the supply device 10, the tablets T are sequentially supplied from the hopper 11 to the alignment feeder 12, and moved as being aligned in two rows by the alignment feeder 12. The tablets T moving in two rows are sequentially supplied to the conveyor belt 21a by the transfer feeder 13. The conveyor belt 21a is rotating in the conveying direction A1 with the rotation of the pulley body 21b and the driven pulleys 21c caused by the motor 21d. Accordingly, the tablets T supplied onto the conveyor belt 21a are conveyed in two rows on the conveyor belt 21a at a predetermined moving speed. The conveyor belt 31a is also rotating in the conveying direction A2 with the rotation of the pulley body 31b and the driven pulleys 31c caused by the motor 31d.

Thereafter, the tablet T on the conveyor belt 21a is detected by the detecting device 22. Thereby, position information (the position in the conveying direction A1) of the tablet T is acquired and fed to the control device 50. The position information of the tablet T is stored in the storage 54 and used for post-processing. Next, an image of the tablet T on the conveyor belt 21a is captured by the first imaging device 23 at the timing based on the position information of the tablet T, and the image is sent to the control device 50. The image processing unit 51 generates positional shift information of the tablet T (for example, positional shift of the tablet T in the X direction, the Y direction, and the 8 direction) based on each image received from the first imaging device 23, and the positional shift information is stored in the storage 54. The print processing unit 52 sets printing conditions (ejection position and ejection speed of the ink, etc.) for the tablet T based on the positional shift information of the tablet T, and the printing conditions are stored in the storage 54.

Subsequently, the print head device 24 performs printing on each of the tablets T on the conveyor belt 21a according to the printing conditions at the timing based on the position information of the tablet T, i.e., at the timing when the tablet T reaches below the print head device 24. In each of the print heads 24a of the print head device 24, ink is appropriately ejected from each of the nozzles 24b. Thus, information such as a letter (for example, alphabet, kana, number), a mark (for example, symbol or figure), or the like is printed on the upper surface of the tablets T.

The second imaging device 25 captures an image of the tablet T having the information printed thereon at the timing based on the position information of the tablet T, and sends the image to the control device 50. The image processing unit 51 generates print position information indicating the print position of a print pattern for each tablet T based on each image sent from the second imaging device 25. The print position information is stored in the storage 54. The inspection processing unit 53 determines whether the printing on the tablet T is acceptable based on the print position information, and print quality information indicating the result of print quality determination is stored in the storage 54 for each tablet T. For example, the inspection processing unit 53 determines whether the print pattern is printed at a predetermined position of the tablet T.

The tablet T after the inspection is conveyed along with the movement of the conveyor belt 21a and passes above the drying device 26. At this time, the drying device 26 dries the ink applied to the tablet T while the tablet T is passing above the drying device 26. The tablet T on which the ink has dried is conveyed with the movement of the conveyor belt 21a and reaches near the end of the conveyor belt 21a on the driven pulley 21c side. At this position, the suction no longer works on the tablet T. The tablet T is released from the hold of the conveyor belt 21a, and is transferred from the first printing device 20 to the second printing device 30.

After that, the printing process and the inspection process are performed in the same manner as described above also in the second printing device 30. The tablet T after the inspection is conveyed with the movement of the conveyor belt 31a and passes above the drying device 36. Then, the tablet T with the ink dried reaches the defective product collecting device 41. The defective tablet T is dropped from the conveyor belt 31a by the gas ejected from the ejection nozzle 41a and collected in the container 41b. On the other hand, the non-defective tablet T passes through the defective product collecting device 41 and reaches the non-defective product collecting device 42. At this position, the suction does not work on the tablet T, and the non-defective tablet T drops from the conveyor belt 31a by the gas blown out from the gas blower 42a, and is collected in the container 42b.

In the printing process described above, the tablet T supplied onto the suction hole 21g is held on the conveyor belt 21a by suction from the suction hole 21g. However, the tablet T supplied to the conveyor belt 21a may shake on the conveyor belt 21a due to vibrations when supplied or acceleration/deceleration in the conveying direction that occurs slightly during conveyance. In particular, if the portion of the tablet T that contacts the surface of the conveyor belt 21a is a curved surface, the shaking motion does not attenuates easily. The shaking motion causing print deviation may remain during printing by the print head 24a.

The print head 24a performs printing along with the movement of the tablet T passing under the print head 24a. Accordingly, if the position of the tablet T, which moves relative to the print head 24a, deviates due to the shaking motion of the tablet T, the print may also deviate depending on the amount of the position deviation.

The conveyor belt 21a is provided with the suction holes 21g for sucking the tablets T as described above, and the tablets T are sucked and held on the surface of the conveyor belt 21a by suction from the suction holes 21g. However, when the tablet T has a curved surface, it is supported at one point of the vertex of the curved surface on the conveyor belt 21a. Therefore, when the tablet T is shaking, the shaking motion does not attenuates easily.

Besides, the tablet T may be a so-called plain tablet made by compressing raw material powder. In the case of such plain tablets, powder tends to be generated from the tablets T during the printing process. The powder is scattered in the tablet printing apparatus 1 and adheres to the surface of the conveyor belt 21a. If the powder adheres to the surface of the conveyor belt 21a, the tablets T are placed on the powder. If the tablets T are sucked and held on the conveyor belt 21a with the powder interposed therebetween, the powder functions as a roller, and the tablets T are more likely to shake. Even if the curved surface of the tablet T fits in the suction hole 21g of the conveyor belt 21a, for example, if the powder is adhering to the edge of the suction hole 21g, the tablet T easily shakes.

Figure 6:
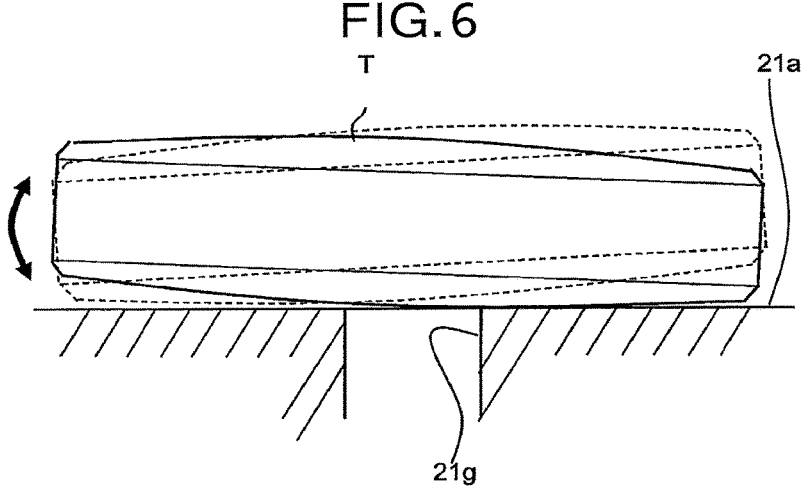
FIG. 6 is a diagram illustrating a tablet that is shaking on a conventional conveyor belt (having no protrusion)
Figure 8:
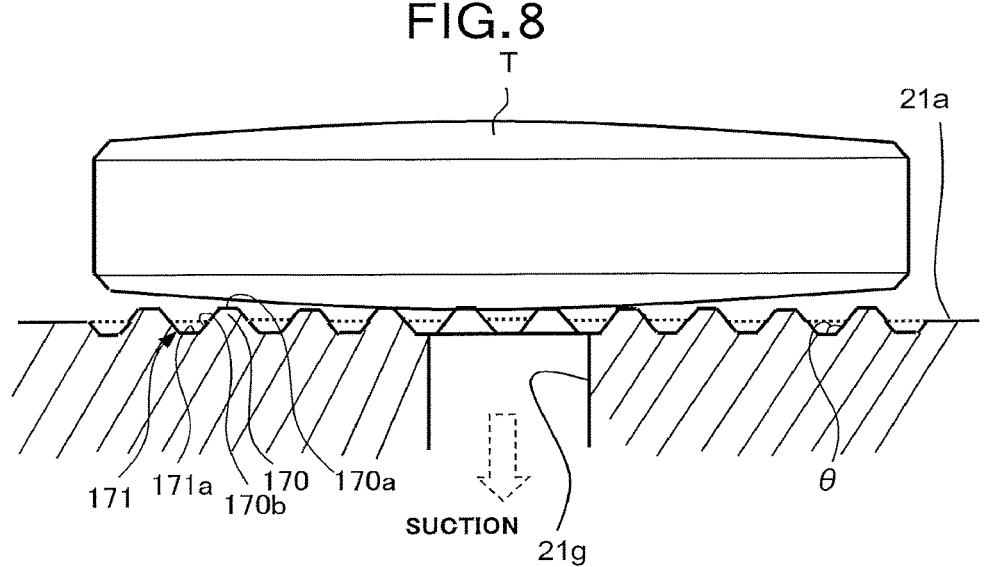
FIG. 8 is a diagram illustrating a tablet on the conveyor belt viewed from a direction parallel to the conveying direction.
Figure 9:
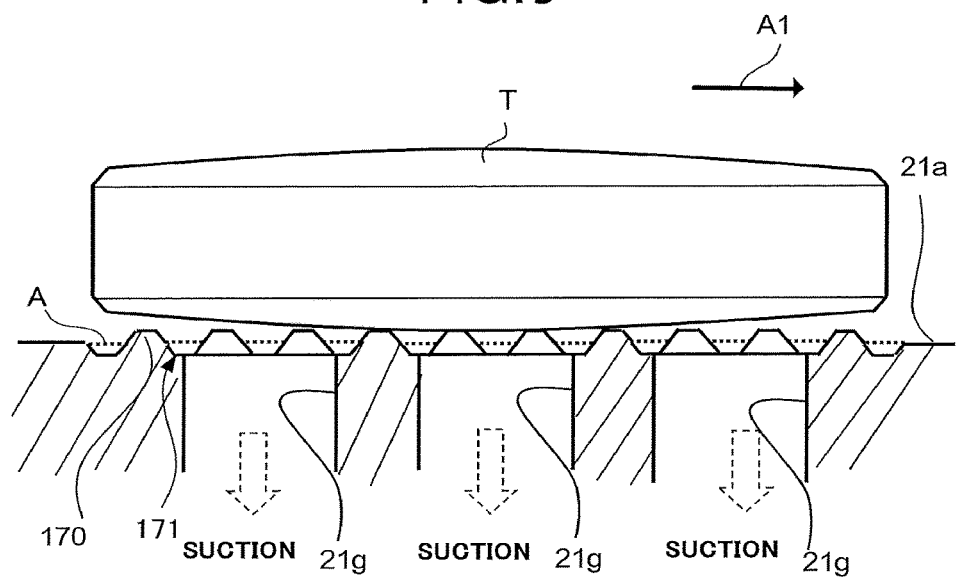
FIG. 9 is a diagram illustrating a tablet on the conveyor belt viewed from a direction perpendicular to the conveying direction.

FIG. 6 illustrates the tablet T having a curved surface and shaking on the surface of the conveyor belt 21a without the protrusions 170. FIG. 7 illustrates the tablet T having a curved surface and shaking on the surface of the conveyor belt 21a having the protrusions 170. FIGS. 8 and 9 illustrate the tablet T having a curved surface, which is supported by the protrusions 170 on the surface of the conveyor belt 21a having the protrusions 170.

FIG. 8 is a schematic diagram of the tablet T placed on the conveyor belt 21a as viewed from the side of the tablet T (viewed from a direction parallel to the conveying direction A1). In FIG. 8, the tablet T is conveyed in a direction from the back to the front with respect to the page. That is, the lateral direction in FIG. 8 corresponds to the width direction of the conveyor belt 21a. FIG. 9 is a view of the side of the tablet T conveyed from the left to the right in the drawing (viewed from a direction perpendicular to the conveying direction A1). That is, the lateral direction in FIG. 9 corresponds to the conveying direction A1.

Note that the following figures illustrating the contact between the protrusions 170 and the tablet T are schematic diagrams of the tablet T placed on the conveyor belt 21a as viewed from the side of the tablet T for easy understanding of the state of the tablet T. Therefore, not all the protrusions are illustrated. Besides, unless otherwise specified, the figures illustrate the tablet T that is being conveyed from the back to the front with respect to the page.

In the case where the tablet T has a curved surface, as illustrated in FIG. 6, the tablet T supplied onto the conveyor belt 21a is supported at one point on the surface of the conveyor belt 21a if the conveyor belt 21a is not provided with the protrusions 170 on the surface thereof. The tablet T shakes with that one point as a fulcrum, and it is difficult to suppress the shaking motion. On the other hand, as illustrated in FIG. 7, if the conveyor belt 21a is provided with the protrusions 170 on its surface, the tablet T shakes as being in contact with the protrusions 170. Because of the protrusions 170 dispersedly touching the surface of the tablet T, the shaking motion is easily suppressed. In other words, since the tablet T is in contact with and supported by a plurality of spaced apart points, the vibration is restricted. Thus, the vibration of the tablet T is easily attenuated.

Further, as illustrated in FIGS. 8 and 9, the conveyor belt 21a of this embodiment is provided with the protrusions 170 around the suction hole 21g in the shake prevention region Ep. Note that "around the suction hole 21g" is within the range of the area of the tablet T sucked from the suction hole 21g, and, if the suction hole 21g is formed in the bottom surface of a groove 21h (described later) formed in the conveyor belt 21a, the surface of the conveyor belt 21a outside the groove 21h is also included in the range. With this, even if the tablet T has a curved surface, it is supported in contact with the protrusions 170 in the conveying direction A1 and a direction crossing the conveying direction A1. Thus, even when the tablet T is shaking, the motion is attenuated quickly as the tablet T is supported by a plurality of spaced apart points. Further, even if acceleration is given during conveyance, the tablet T does not easily shake.

In addition, the recess 171 communicating with the suction hole 21g is formed between the protrusions 170. The protrusions 170 support the tablet T such that a gap is formed between the surface of the tablet T on the conveyor belt 21a side and the suction hole 21g. The tablet T is sucked by applying a suction force to the gap and the space of the recess 171 through the suction hole 21g. Thereby, even if powder adheres to the surface of the conveyor belt 21a, the powder falls into the recess 171 between the protrusions 170. As a result, the powder does not touch the tablet T, and it is possible to suppress the action of reducing the contact resistance of the tablet T with respect to the conveyor belt 21a.

In each of the protrusions 170, the area of the surface to be in contact with the tablet T (the upper surface 170a) is smaller than the area of the surface in contact with the conveyor belt 21a (the bottom surface 170c), and the side surface has an inclined surface. With this, the area of the upper surface 170a can be made smaller without changing the area of the bottom surface 170c of the protrusion 170 as compared to a protrusion having no inclined surface. Thus, the tablet T can be supported stably without changing the area of the bottom surface 170c. Moreover, since the upper surface 170a can be made smaller, even if powder adheres to the upper surface 170a of the protrusion 170 or the edge or the vertex of the upper surface 170a, the contact area with the tablet T is very small and the surface pressure is high as the area is small. Accordingly, even if powder is interposed between the tablet T and the conveyor belt 21a, it does not lead to a decrease in contact resistance that shakes the tablet T.

Further, the protrusions 170 are arranged in row over the suction holes 21g and there are lines of the protrusions 170. There are lines of the recesses 171, which are communicated with the suction holes 21g, each between rows of the protrusions 170. As a result, the suction force caused by suction from the suction hole 21g and acting on the tablet T also acts on the space of the recesses 171 between rows of the protrusions 170. Thus, a suction force can be applied to the tablet T in a range larger than the size of the suction hole 21g. Accordingly, the tablets T are sucked and held by a larger force, and the shaking motion of the tablets T is more suppressed. Besides, a plurality of lines of the recesses 171 are formed across the suction holes 21g. Therefore, not only the suction force from one suction hole 21g but the suction force from a plurality of suction holes 21g can be applied to the space of the recesses 171. Thereby, the suction force acting on the tablets T can be made uniform, and the tablet T is not disproportionately sucked from a specific suction hole 21g. Thus, it is possible to suppress the tablet T from being inclined and rattling when it is sucked from the suction hole 21g.

The bottom surface 171a of the recess 171 is located at a height lower than the height A of the surface of the conveyor belt 21a outside the region where the protrusions 170 are formed. Therefore, even if powder generated from the tablets T adheres to the surface of the conveyor belt 21a, the powder falls into the recesses 171 and stays at the bottom surface 171a. Thereby, it is possible to suppress the adhesion of powder to the upper surface 170a of the protrusion 170 and the surface of the tablet T. As a result, the action of reducing the contact resistance of the tablet T to the conveyor belt 21a due to the adhesion of powder is suppressed. Thus, the shaking motion of the tablet T can be suppressed.

Lines of the recesses 171 are formed between rows of the protrusions 170 on the surface of the conveyor belt 21a. Since the outer angle θ formed between the side surface 170b of the protrusion 170 and the bottom surface 171a of the recess 171 is an obtuse angle, it is easy to scrape out the powder by the brush of the cleaning device 27 in the shake prevention region Ep on the surface of the conveyor belt 21a. Thus, the removal rate of the powder increases. This further reduces the influence of the powder.

Therefore, by using the conveyor belt 21a of the embodiment having the protrusions 170 on the surface, it is possible to suppress the shaking motion of the tablets T sequentially supplied from the transfer feeder 13 located above the conveyor belt 21a to the conveyor belt 21a. As a result, the tablets T conveyed by the conveyor belt 21a can pass through just under the print head 24a without shaking or with a little shaking, thus enabling good printing on the tablets T. This also applies to the second printing device 30 which receives the tablets T from the first printing device 20.

Figure 10A:
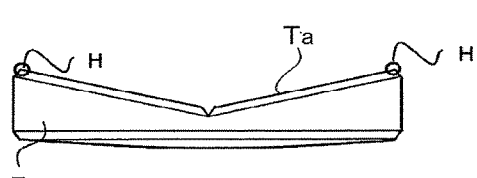
FIGS. 10A, 10B and 10C is a diagram illustrating an example of the shape of the tablet.
Figure 10B:
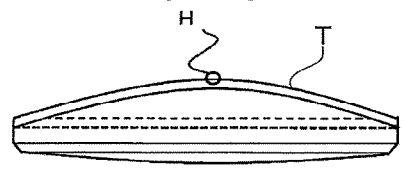
Figure 10C:
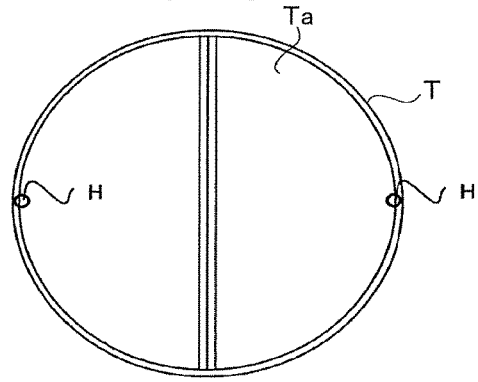
Figure 11:
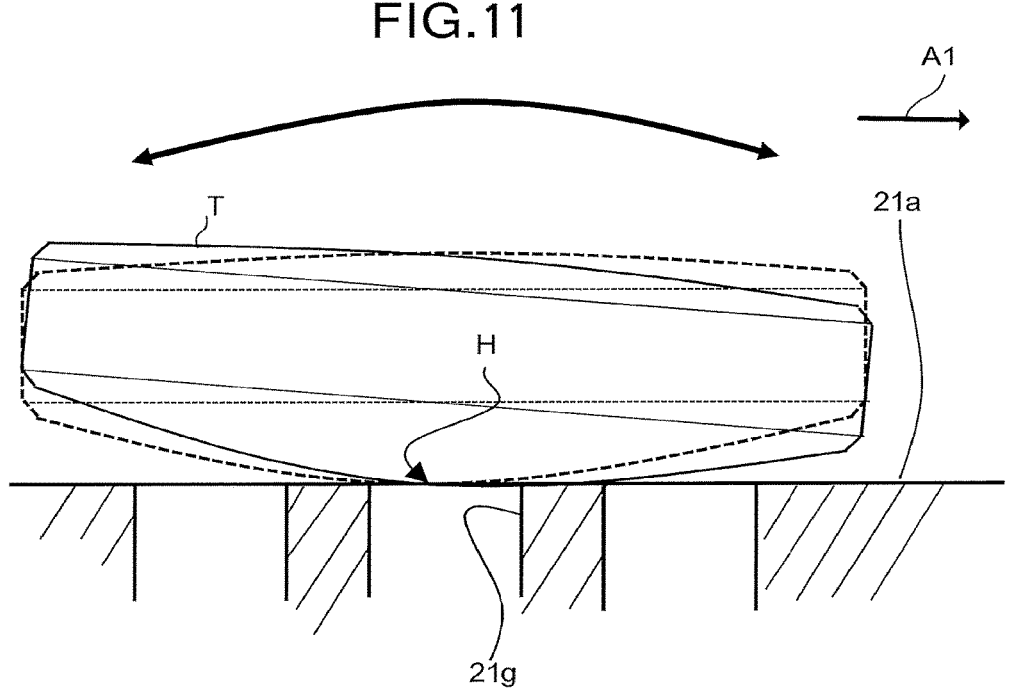
FIG. 11 is a diagram of the tablet illustrated in FIGS. 10A, 10B and 10C that is shaking on the conventional conveyor belt (having no protrusion)

FIGS. 10A, 10B and 10C illustrates a tablet T having a recessed portion to split the tablet T on one of the surfaces. FIG. 10A illustrates the front surface, FIG. 10B illustrates the upper surface, and FIG. 10C illustrates the side surface of the tablet T. There are various types of recessed portions including a groove-like recess and a large recess as illustrated in FIGS. 10A, 10B and 10C. In particular, if the tablet T has a large recessed portion as illustrated in FIGS. 10A, 10B and 10C, when the surface having the recessed portion is on the side of the conveyor belt 21a, the tip of the edge of the recessed portion indicated by H in FIGS. 10A, 10B and 10C *comes* into contact with the conveyor belt 21a. The tip of H portion often has also a curved surface. In the case of such a recessed portion as to split the tablet T into two, there are two opposing H portions. When these two H portions contact the conveyor belt 21a, the suction hole 21g cannot be closed, resulting in a decrease in the suction force acting on the tablet T. Since the tablet T is supported on the conveyor belt 21a at the H portions of two opposing points, the tablet T is less likely to shake in a direction connecting the H portions of two opposing points. However, the tablet T easily shakes in a direction perpendicular to the direction connecting the two opposing H portions (FIG. 11).

Figure 12:
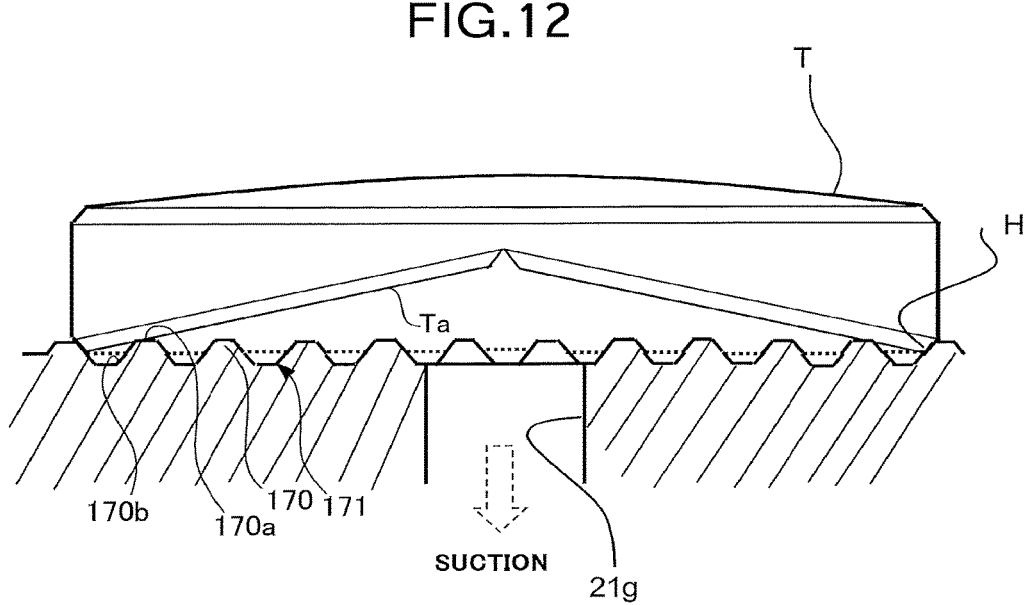
FIG. 12 is a diagram illustrating an example of the tablet illustrated in FIGS. 10A, 10B and 10C on the conveyor belt.

By the way, because of the pointed shape, the H portions easy fit in between rows of the protrusions 170 formed on the conveyor belt 21a of this embodiment. Further, the H portions thus fitted makes contact with many of the protrusions 170, and the periphery of the tablet T is supported in contact with the upper surface 170a or the side surface 170b of the protrusion 170 (FIG. 12). Accordingly, it is possible to suppress the shaking motion in a direction perpendicular to the direction connecting the two opposing H portions. The same effect can be obtained if only one of the two opposing H portions fits in. Since the protrusions 170 of this embodiment has a truncated pyramid shape, the side surface 170b is an inclined surface, and the area of the side surface 170b is larger than that of a rectangular parallelepiped protrusion of the same height. As a result, the tip of the recessed portion of the tablet T is more likely to come into contact with the side surface 170b. Thus, the H portions more easily fit in between the protrusions 170.

Figure 13:
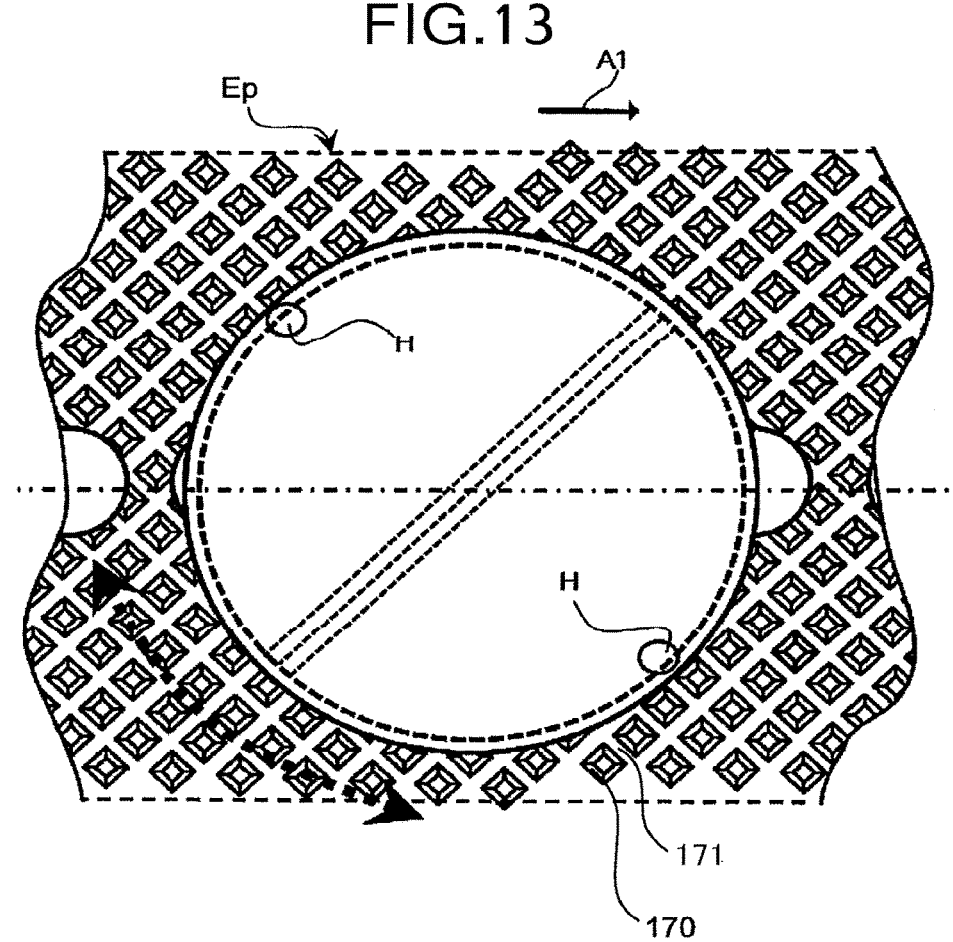
FIG. 13 is a plan view illustrating an example of the tablet illustrated in FIGS. 10A, 10B and 10C on the conveyor belt.

The H portions are located (oriented) at random with respect to the conveying direction A1. However, rows of the truncated pyramidal protrusions 170 serves as a guide, and before the H portions fit into the recess between the rows of the protrusions 170, the orientation of the tablet T is likely to follow the direction of the rows of the protrusions 170 due to the movement of the tablet T in a shaking motion or the like. Therefore, when the rows of the protrusions 170 are at an angle with respect to the conveying direction A1, in particular, at an angle of 45°, the tablet T is often located such that the direction of the large recessed portion is at 45° to the conveying direction A1, in which the tablet T is less likely to shake in a direction parallel to the conveying direction A1 as well as a direction perpendicular thereto. Thereby, the shaking motion of the tablet T can be suppressed (FIG. 13).

Even if the rows of the protrusions 170 are arranged either in parallel to or perpendicular to the conveying direction A1, or in the both directions, the H portions are supported at a plurality of points. Accordingly, the shaking motion of the tablet T can also be suppressed.

As described above, even if the tablet T has a large recessed portion as illustrated in FIGS. 10A, 10B and 10C, by using the conveyor belt 21a of this embodiment having the protrusions 170 on the surface, it is possible to suppress the shaking motion of the tablets T sequentially supplied to the conveyor belt 21a. As a result, the tablets T conveyed by the conveyor belt 21a can pass through just under the print head 24a without shaking or with a little shaking, thus enabling good printing on the tablets T.

Described below is the observation of the occurrence rate of printing failure which was conducted by printing on the tablets T using a conventional tablet printing apparatus without the protrusions 170 and the tablet printing apparatus 1 of this embodiment. The tablet printing apparatus 1 employs a lattice-shaped conveyor belt in which a row pattern of the protrusions 170 is tilted by 45° with respect to the conveying direction A1 as illustrated in FIG. 5. Besides, the tablet T is in a circular shape with a diameter of 7 mm, and has a curved surface on one side and the recessed portion Ta over almost the entire surface of the other side as illustrated in FIGS. 10A, 10B and 10C.

First, printing was performed on 10,000 tablets with the conventional tablet printing apparatus without the protrusions 170. As a result, printing failure occurred in about 500 tablets, and the printing failure rate was about 5%.

Next, printing was performed on 10,000 tablets with the tablet printing apparatus 1 of the embodiment. As a result, printing failure occurred in about 10 tablets, and the printing failure rate was about 0.1%.

In the supply of the tablets T to the conveyor belt 21a, the probability of whether the curved surface side or the recessed portion Ta side of the tablet T contacts the belt is about fifty-fifty. The tablet T is reversed after being printed by the first printing device 20 and printed by the second printing device 30. In other words, printing is performed on both the curved surface side and the recessed surface side of the tablet T.

It can be seen from the observation result of the occurrence rate of printing failure that, with the conveyor belt 21a of this embodiment having the protrusions 170, regardless of whether the curved surface side or the recessed surface side of the tablet T is in contact with the conveyor belt 21a, the shaking motion of the tablet T can be suppressed, and printing failure is reduced.

As described above, according to the embodiment, the conveyor belt 21a is provided with the protrusions 170 on the surface thereof. With this, it is possible to suppress the shaking motion of the tablets T on the conveyor belt 21a. Thus, it is possible to reduce the degradation of the print quality due to the shaking motion of the tablets T. Although this embodiment has been mainly described with the first printing device 20, the same applies to the second printing device 30.

Other Embodiments

Figure 14:
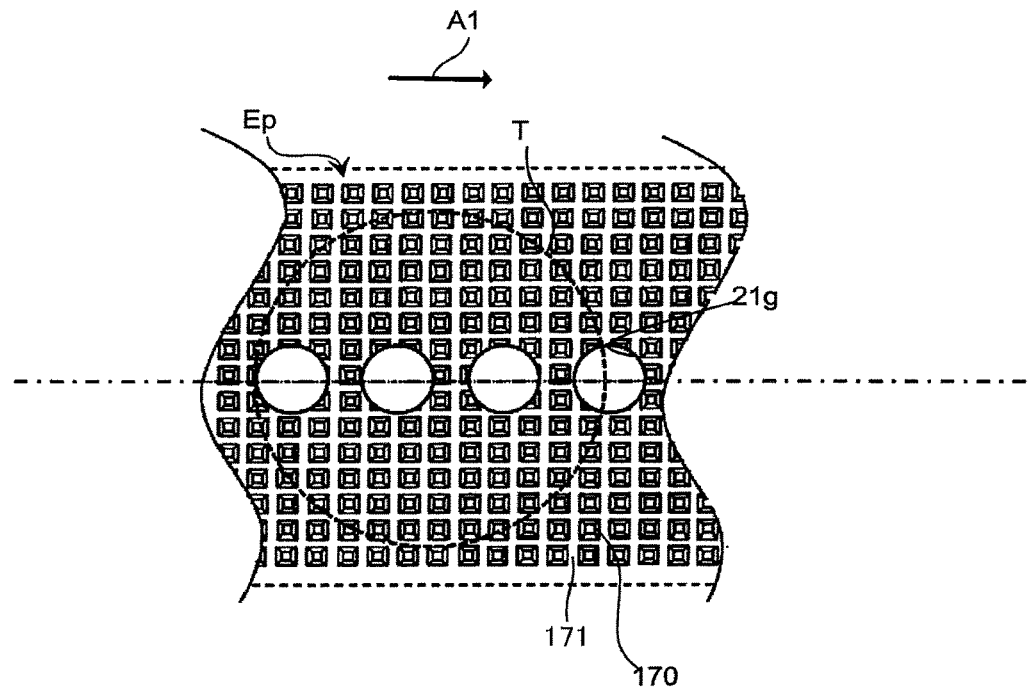
FIG. 14 is a plan view illustrating an arrangement example of protrusions on the conveyor belt.
Figure 15:
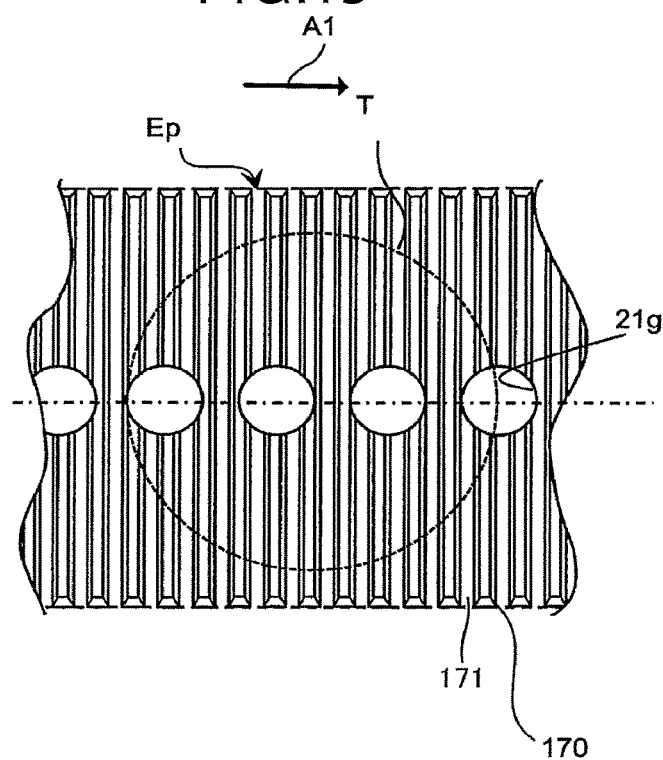
FIG. 15 is a plan view illustrating an arrangement example of protrusions on the conveyor belt.

In the embodiment described above, rows of the protrusions 170 are arranged along two axes perpendicular to each other, each at an angle of 45° with respect to the conveying direction A1, on the surface of the conveyor belt 21a. However, it is not so limited, and the angle with respect to the conveying direction A1 may be set as appropriate, for example, it may be 30°. In addition, as illustrated in FIG. 14, rows of the protrusions 170 may be arranged along two axes, one of which is parallel to the conveying direction A1 and the other is perpendicular to the conveying direction A1. Further, as illustrated in FIG. 15, each of the protrusions 170 may be in a truncated rectangular frustum shape, the long side of which is as long as the width of the shake prevention region Ep or the width of the conveyor belt 21a, and the rectangular frustum-shaped protrusions 170 may be arranged in parallel to the conveying direction A1. That is, the protrusions 170 may be formed such that the upper surface 170a and the bottom surface 170c thereof have shorter sides and longer sides, and arranged in rows in parallel to each other such that their long sides are perpendicular to the conveying direction A1.

In the above embodiment, the conveyor belt 21a is provided with the protrusions 170 in the shape of a truncated pyramid having the bottom surface 170c and the upper surface 170a. The side surface 170b connecting the bottom surface 170c and the upper surface 170a is an inclined flat surface; however, it is not so limited. The side surface 170b connecting the bottom surface 170c and the upper surface 170a may be a curved surface. It is only required that the area of the surface (the upper surface 170a) of the protrusions 170 on the side in contact with the tablets T is smaller than the area of the bottom surface 170c, and the side surface 170b has an inclined surface. Besides, the protrusions 170 need not necessarily be in a truncated pyramid shape, and may have a polygonal pyramid shape such as triangle or pentagon, or a frustum shape of circular cone. Further, the protrusions 170 may be in a conical shape (pyramid shape, circular cone shape). The upper surface 170a may be a point, a curved surface, or a spherical surface. When the protrusions 170 have a conical shape, the upper surface 170a is a point. In this case, the tips of the protrusions 170 easily bend, and therefore the vibration of the tablets T is easily attenuated. In addition, since the protrusions 170 come in point contact with the tablets T, the powder on the protrusions 170 is less likely to adhere to the tablets T. On the other hand, if the upper surface 170a of the protrusions 170 is a flat surface, the inner angle formed by the upper surface 170a and the side surface 170b is an obtuse angle, and if it is a curved surface or a spherical surface, the surface where the upper surface 170a and the side surface 170b intersect is a rounded surface. This prevents the abrasion and cracking of the protrusions 170 as well as the generation of dust due to the provision of the protrusions 170. Moreover, the shaking motion of the tablets T can be suppressed as in the case of powder.

In the above embodiment, regions of a predetermined width (shaded portion in FIG. 3) each including one of rows of the suction holes 21g at the center is described as a region Ep where the tablets T can be placed (referred to as "shake prevention regions"), and the protrusions 170 are formed in each of the shake prevention regions Ep. However, it is not so limited, and for example, the protrusions 170 may be formed over the width of the conveyor belt 21a (conveyor belt width).

However, in this case, when heat is applied to form the protrusions 170 on the surface of the resin-made conveyor belt 21a, heat is applied to the entire width of the conveyor belt 21a. This may sometimes cause a deformation such as twisting of the conveyor belt 21a. Therefore, it is better that the range where heat is applied is as narrow as possible. Accordingly, it is preferable to provide the protrusions 170 only in the shake prevention region Ep. In the case where the protrusions 170 are formed only in the shake prevention region Ep, the area for forming the protrusions 170 is reduced as compared to the case where the protrusions 170 are formed in the entire surface of the conveyor belt 21a. This facilitates the formation of the protrusions 170. On the other hand, when the protrusions 170 are formed in the entire surface of the conveyor belt 21a, the restriction on the place where the tablets T are supplied is reduced, and thereby the tablet supply position and the like can be easily adjusted.

In the above embodiment, the conveyor belt 21*a* is described by way of example as being made of a urethane resin and having a hardness of Hs 90. However, the conveyor belt 21*a* may be made of any material as long as its hardness is higher than Hs 50. When a material having a hardness of Hs 50 or less is used, the durability is low. As a result, for example, the protrusions 170 are worn away due to the cleaning of the surface of the conveyor belt 21*a* by the cleaning device 27 and the like, which reduces the effect of suppressing the shaking motion of the tablets T.

In the above embodiments, an example is described in which the tablets T are conveyed in two rows; however, it is not so limited. The number of rows is not particularly limited, and there may be one row, three rows, or four or more rows.

In the above embodiments, there is provided only one conveyor belt 21*a*; however, it is not so limited. The number of conveyor belt is not particularly limited, and there may be two or more conveyor belts. For example, a plurality of conveyor belts 21*a* may be arranged in parallel.

In the above embodiments, the suction holes 21*g* of the conveyor belt 21*a* are described as being circular; however, it is not so limited. The shape of the suction holes 21*g* of the conveyor belt 21*a* is not particularly limited, and the suction holes may be in a rectangular shape, an elliptical shape, or a slit-like shape.

In the above embodiments, the print head 24*a* is described as being provided for each conveying path of the tablets T; however, it is not so limited. For example, one print head 24*a* may perform printing on two or more rows of tablets T.

In the above embodiments, a print head in which the nozzles 24*b* are arranged in a row is exemplified as the ink jet print head 24*a*; however, it is not so limited. For example, a print head in which the nozzles 24*b* are arranged in a plurality of rows may be used. Further, a plurality of print heads 24*a* may be arranged along the conveying direction A1 of the tablets T.

In the above embodiments, an example is described in which the first printing device 20 and the second printing device 30 are placed one above the other to perform printing on both sides or one side of the tablet T; however, it is not so limited. For example, only the first printing device may be provided to perform printing only on one side of the tablet T.

In the above embodiments, the gas blower 42*a* is described as being provided to the non-defective product collecting device 42; however, it is not so limited. For example, the gas blower 42*a* may be provided to the end portion of the conveying device 21 on the conveying device 31 side or a place where the tablets T are transferred from the transfer feeder 13 to the conveying device 21. In other words, the gas blower 42*a* may be used at a place where the tablet T is desired to be taken off from the conveyor belt 21*a*.

Figure 16:
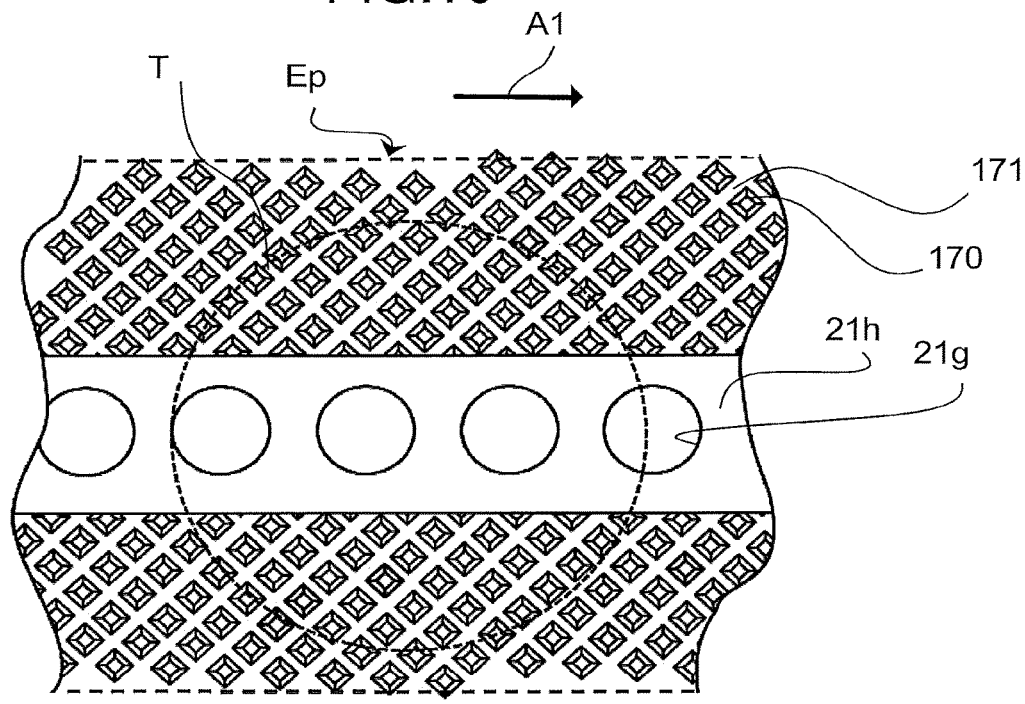
FIG. 16 is a plan view illustrating a conveyor belt having a groove formed therein.
Figure 17:
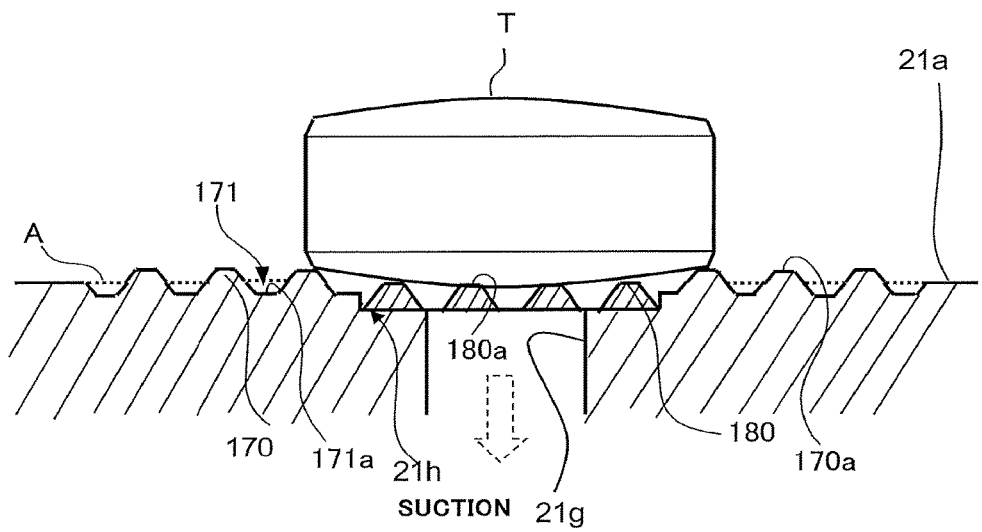
FIG. 17 is a diagram illustrating an example of the tablet illustrated in FIGS. 10A, 10B and 10C on the conveyor belt.

In the above embodiment, the conveyor belt 21*a* is provided with only the protrusions 170 on the surface thereof. However, as illustrated in FIGS. 16 and 17, the conveyor belt 21*a* may also be provided with the groove 21*h* having a predetermined depth and extending along the conveying direction A1. In this case, the suction holes 21*g* are formed at regular intervals in the bottom of the groove 21*h*. The width of the groove 21*h* is smaller than the diameter of the tablet T to be conveyed and larger than the suction hole 21*g*. The protrusions 170 are formed at a predetermined density in a predetermined range on the surface of the conveyor belt 21*a* raised from the groove 21*h* (see FIG. 16).

In the conveyor belt 21*a*, the tablets T are conveyed while being placed on the groove 21*h* without largely separating therefrom because of air suction operation over the entire groove 21*h* by suction from the suction holes 21*g*. In this process, each of the tablets T is more quickly restrained from shaking due to a larger suction operation through the groove 21*h* than in the case of suction from only the suction holes 21*g*. In addition, as coming in contact with the protrusions 170, the tablets T are further suppressed from shaking, and the shaking motion is attenuated more effectively.

Incidentally, protrusions (second protrusions) 180 may also be formed inside the groove 21*h* (for example, the surface of the bottom, that is, the bottom surface) at a predetermined density (see FIG. 17). If the protrusions 180 are provided inside the groove 21*h*, as illustrated in FIG. 17, a height of an upper surface 180*a* of the protrusion 180 may be set equal to or less than the height of the upper surface 170*a* of the protrusion 170 provided outside the groove 21*h*, and be set the height so that the surface of the tablet T on the side of the conveyor belt 21*a* come into contact with the upper surface 180*a* of the protrusion 180. Thereby, even if the diameter of the tablet T is small and the periphery of the tablet T cannot fully contact the upper surface 170*a* of the protrusion 170 arranged outside the groove 21*h*, the tablet T comes in contact with the upper surface 180*a* of the protrusion 180 and can be stably supported.

In the above embodiment, the bottom surface 171*a* of the recess 171 is described as being located at a height lower than the height A of the surface of the conveyor belt 21*a* outside the region where the protrusions 170 are formed. However, the height of the bottom surface 171*a* of the recess 171 may be about the same as the height A of the surface of the conveyor belt 21*a* outside the region where the protrusions 170 are formed. In this case also, the space can be formed as the recess 171 between the protrusions 170.

Further, in the cleaning devices 27 and 37 of the above embodiment, the rotation axis of the rotating brush can be set to a direction along a row pattern of the protrusions 170 on the surface of the conveyor belt. For example, as illustrated in FIG. 5, when the row pattern of the protrusions 170 are arranged in a lattice pattern inclined by 45° with respect to the conveying direction A1, the rotation axis of the rotating brush is tilted by 45° with respect to the conveying direction A1 in a horizontal plane. There may also be provided two brushes such that their respective rotation axes are tilted by +45° and −45° with respect to the conveying direction A1 in a horizontal plane. Further, for example, as illustrated in FIG. 14, when the row pattern of the protrusions 170 are arranged along two axes, one of which is parallel to the conveying direction A1 and the other is perpendicular to the conveying direction A1, the rotation axis of the rotating brush is set to be parallel to or perpendicular to the conveying direction A1 in a horizontal plane. Still further, for example, as illustrated in FIG. 15, when the protrusions 170 are arranged in parallel in the conveying direction A1, the rotation axis of the rotating brush is set to be perpendicular to the conveying direction A1 in a horizontal plane.

In this manner, by making it possible to scrape out powder in a direction along the row pattern of the protrusions 170, powder or the like adhering to the surface of the conveyor belt 21*a* can be removed more reliably. Besides, as illustrated in FIG. 15, when the rotation axis of the rotating brush is tilted perpendicularly to the conveying direction A1, by synchronizing the rotation speed of the rotating brush and the tablet conveyance speed, the rotating brush can be less likely to be caught on the conveyor belt 21a.

The above-described tablets may include tablets for pharmaceutical use, edible use, cleaning, industrial use, and aromatic use. Examples of the tablets include plain tablets (uncoated tablets), sugar-coated tablets, film-coated tablets, enteric coated tablets, gelatin coated tablets, multilayered tablets, dry-coated tablets, and the like. Examples of the tablet further include various capsule tablets such as hard capsules and soft capsules. The tablets may be in a variety of shapes such as, for example, a disk shape, a lens shape, a triangle shape, an oval shape, and the like. In the case where tablets to be printed are for pharmaceutical use or edible use, edible ink is suitably used. As the edible ink, any of synthetic dye ink, natural color ink, dye ink, and pigment ink may be used.

While certain embodiments have been described, these embodiments have been presented by way of example only, and are not intended to limit the scope of the inventions. Indeed, the novel embodiments described herein may be embodied in a variety of other forms; further, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tablet printing apparatus, comprising:
    a conveyor belt including a suction hole to suck a tablet; and
    an ink jet print head configured to perform printing on the tablet conveyed by the conveyor belt; wherein
    the conveyor belt further includes
        a plurality of protrusions formed around the suction hole and configured to support the tablet in contact with the tablet, and
        a recess formed between the protrusions and communicated with the suction hole,
    each of the protrusions has a bottom surface, an upper surface, area of which is smaller than that of the bottom surface, and a side surface having an inclined surface,
    the protrusions are configured to support the tablet such that a gap is formed between a surface of the tablet on conveyor belt side and the suction hole, and
    a suction force is applied to the gap and space of the recess through the suction hole to suck the tablet.

2. The tablet printing apparatus according to claim 1, wherein the protrusions have a conical shape or a frustum shape.

3. The tablet printing apparatus according to claim 1, wherein the protrusions are arranged in rows on a surface of the conveyor belt.

4. The tablet printing apparatus according to claim 3, wherein the recess is formed in a line between rows of the protrusions and is communicated with the suction hole.

5. The tablet printing apparatus according to claim 3, wherein rows of the protrusions are arranged along a direction crossing a conveying direction of the tablet in a horizontal plane.

6. The tablet printing apparatus according to claim 5, wherein the rows of the protrusions are arranged along two axes perpendicular to each other, each at an angle of 45° with respect to the conveying direction of the tablet.

7. The tablet printing apparatus according to claim 1, wherein outer angle formed between the side surface of the protrusion and a bottom surface of the recess is an obtuse angle.

8. The tablet printing apparatus according to claim 1, wherein
    the protrusions are formed in a region where the tablet can be placed on the conveyor belt, and
    a bottom surface of the recess is located at a height lower than height of the surface of the conveyor belt outside the region where the protrusions are formed.

9. The tablet printing apparatus according to claim 1, wherein the protrusions are formed integrally with the conveyor belt.

10. The tablet printing apparatus according to claim 1, wherein
    the tablet to be printed has a recessed portion on its surface, and
    the protrusions are configured to support the tablet while the upper surface or the side surface thereof are in contact with a periphery of the tablet.

11. The tablet printing apparatus according to claim 1, wherein
    the conveyor belt further includes a groove extending along a conveying direction of the tablet, and
    the suction hole is formed in a bottom surface of the groove.

12. The tablet printing apparatus according to claim 11, wherein a plurality of second protrusions are formed in the bottom surface of the groove.

* * * * *